US011193052B2

(12) United States Patent
Alshaikh et al.

(10) Patent No.: US 11,193,052 B2
(45) Date of Patent: Dec. 7, 2021

(54) SEALING COMPOSITIONS AND METHODS OF PLUGGING AND ABANDONING OF A WELLBORE

(71) Applicant: Saudi Arabian Oil Company, Dhahran (SA)

(72) Inventors: Abrar Alshaikh, Dammam (SA); Mohammad Aljubran, Dammam (SA); Abdullah Al-Yami, Dhahran (SA); Vikrant Wagle, Abqaiq (SA); Ali Al-Safran, Dhahran (SA); Nassar Alhareth, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/829,470

(22) Filed: Mar. 25, 2020

(65) Prior Publication Data

US 2021/0261849 A1    Aug. 26, 2021

Related U.S. Application Data

(60) Provisional application No. 62/981,187, filed on Feb. 25, 2020.

(51) Int. Cl.
| | | |
|---|---|---|
| *E21B 33/13* | (2006.01) | |
| *C09K 8/42* | (2006.01) | |
| *C09K 8/44* | (2006.01) | |
| *C04B 24/12* | (2006.01) | |
| *C04B 26/14* | (2006.01) | |
| *C04B 103/12* | (2006.01) | |

(52) U.S. Cl.
CPC ............ *C09K 8/426* (2013.01); *C04B 24/121* (2013.01); *C04B 26/14* (2013.01); *C09K 8/44* (2013.01); *E21B 33/13* (2013.01); *C04B 2103/12* (2013.01)

(58) Field of Classification Search
None
See application file for complete search history.

(56) References Cited

U.S. PATENT DOCUMENTS

| | | |
|---|---|---|
| 602,375 A | 4/1898 | Suydam |
| 3,250,330 A | 5/1966 | Smith, Jr. |
| 3,476,189 A | 11/1969 | Bezemer et al. |
| 3,565,176 A | 2/1971 | Wittenwyler |
| 3,646,999 A | 3/1972 | Hamby, Jr. et al. |
| 3,915,232 A | 10/1975 | Gruesbeck |
| 4,003,873 A | 1/1977 | Smith |
| 4,042,032 A | 8/1977 | Anderson et al. |
| 4,072,194 A | 2/1978 | Cole et al. |
| 4,199,484 A | 4/1980 | Murphey |
| 4,247,430 A | 1/1981 | Constien |
| 4,665,988 A | 5/1987 | Murphey et al. |
| 4,730,675 A | 3/1988 | Wygant et al. |
| 4,749,042 A | 6/1988 | Wu |
| 4,799,553 A | 1/1989 | Wu |
| 5,178,218 A | 1/1993 | Dees |
| 5,712,314 A | 1/1998 | Surles et al. |
| 5,770,657 A | 6/1998 | Chou et al. |
| 5,873,413 A * | 2/1999 | Chatterji .................. C09K 8/42 166/293 |
| 5,875,844 A | 3/1999 | Chatterji et al. |
| 5,875,845 A | 3/1999 | Chatterji et al. |
| 5,911,282 A | 6/1999 | Onan et al. |
| 5,959,061 A | 9/1999 | Neumann et al. |
| 6,016,870 A | 1/2000 | Dewprashad et al. |
| 6,124,246 A | 9/2000 | Heathman et al. |
| 6,196,316 B1 | 3/2001 | Bosma et al. |
| 6,234,251 B1 | 5/2001 | Chatterji et al. |
| 6,271,181 B1 | 8/2001 | Chatterji et al. |
| 6,316,529 B1 | 11/2001 | Temme et al. |

(Continued)

FOREIGN PATENT DOCUMENTS

| | | |
|---|---|---|
| CA | 2709646 A1 | 7/2009 |
| CN | 101451061 A | 6/2009 |

(Continued)

OTHER PUBLICATIONS

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Casing: Integrating Cementing Technology with New Log Interpretation Methodology To Provide an Innovative Well Integrity Solution", SPWLA 55th Annual Logging Symposium, May 18-22, 2014.

Moe et al., "Anular pressure buildup: What it is and what to do about it", World Oil Deepwater Technology Supplement, Issue, p. 21-23, Aug. 2000.

(Continued)

*Primary Examiner* — Andrew Sue-Ako
(74) *Attorney, Agent, or Firm* — Dinsmore & Shohl LLP

(57) ABSTRACT

Sealing composition for plugging and abandoning a wellbore and methods of plugging and abandoning a wellbore are disclosed. Embodiments of a method for plugging and abandoning a wellbore may include introducing a sealing composition into a wellbore and curing the sealing composition to form a plug. The sealing composition may include from 1 weight percent to 20 weight percent of a curing agent, based on the total weight of the composition, and from 20 weight percent to 97 weight percent of an epoxy resin system, based on the total weight of the composition. The epoxy resin system may include an epoxy resin having the formula $(OC_2H_3)-CH_2-O-R^1-O-CH_2-(C_2H_3O)$, where $R^1$ is a linear or branched hydrocarbyl having from 4 to 24 carbon atoms; and a reactive diluent having the formula $R-O-CH_2-(C_2H_3O)$, where R is a hydrocarbyl having from 12 to 14 carbon atoms.

15 Claims, No Drawings

(56) References Cited

U.S. PATENT DOCUMENTS

| | | |
|---|---|---|
| 6,321,841 B1 | 11/2001 | Eoff et al. |
| 6,328,106 B1 | 12/2001 | Griffith et al. |
| 6,448,206 B1 | 9/2002 | Griffith et al. |
| 6,450,260 B1 | 9/2002 | James et al. |
| 6,478,088 B1 | 11/2002 | Hansen et al. |
| 6,802,375 B2 | 10/2004 | Bosma et al. |
| 6,837,316 B2 | 1/2005 | Reddy et al. |
| 6,880,642 B1 | 4/2005 | Garrett et al. |
| 7,673,686 B2 | 3/2010 | Nguyen et al. |
| 7,762,329 B1 | 7/2010 | Morgan et al. |
| 7,926,591 B2 | 4/2011 | Nguyen et al. |
| 7,956,017 B2 | 6/2011 | Gatlin et al. |
| 7,975,764 B2 | 7/2011 | Sullivan et al. |
| 8,157,009 B2 | 4/2012 | Patil et al. |
| 8,235,116 B1 | 8/2012 | Burts, Jr. et al. |
| 8,273,426 B1 | 9/2012 | Laramay et al. |
| 8,307,899 B2 | 11/2012 | Brenneis et al. |
| 8,664,285 B2 | 3/2014 | Birnbrich et al. |
| 8,789,595 B2 | 7/2014 | Guerrero et al. |
| 8,857,515 B2 | 10/2014 | Weaver |
| 8,936,087 B2 | 1/2015 | Nguyen et al. |
| 8,944,164 B2 | 2/2015 | Veldman et al. |
| 8,946,130 B2 | 2/2015 | Zamora et al. |
| 9,150,775 B2 | 10/2015 | Östvold |
| 9,321,953 B1 | 4/2016 | Ferrell, Jr. et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,902,891 B2 | 2/2018 | Hundt et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2001/0035111 A1 | 11/2001 | Gienau et al. |
| 2002/0020530 A1 | 2/2002 | Griffith et al. |
| 2006/0219405 A1 | 10/2006 | Nguyen et al. |
| 2007/0093393 A1 | 4/2007 | Navarrete et al. |
| 2007/0102156 A1 | 5/2007 | Nguyen et al. |
| 2008/0110624 A1 | 5/2008 | Nguyen et al. |
| 2008/0277117 A1 | 11/2008 | Burts, Jr. et al. |
| 2010/0326660 A1 | 12/2010 | Ballard et al. |
| 2011/0088916 A1 | 4/2011 | Heijnen |
| 2011/0203795 A1 | 8/2011 | Murphy et al. |
| 2011/0284247 A1 | 11/2011 | Zamora et al. |
| 2011/0308799 A1 | 12/2011 | Tarafdar et al. |
| 2012/0328377 A1 | 12/2012 | Brenneis et al. |
| 2013/0008654 A1 | 1/2013 | Deville et al. |
| 2013/0105162 A1* | 5/2013 | Abad ............... E21B 33/13 166/295 |
| 2013/0178590 A1 | 7/2013 | Jin et al. |
| 2013/0292116 A1 | 11/2013 | Nguyen et al. |
| 2014/0027116 A1 | 1/2014 | Suresh et al. |
| 2014/0076563 A1* | 3/2014 | Lin ............... C04B 26/04 166/295 |
| 2014/0083702 A1 | 3/2014 | Godfrey et al. |
| 2014/0367105 A1 | 12/2014 | Karcher et al. |
| 2015/0152708 A1 | 6/2015 | Smith |
| 2015/0167424 A1 | 6/2015 | Richards et al. |
| 2016/0046853 A1 | 2/2016 | Chatterji et al. |
| 2016/0194544 A1* | 7/2016 | Jones ............... E21B 33/14 166/295 |
| 2016/0194548 A1 | 7/2016 | Xie et al. |
| 2016/0208157 A1 | 7/2016 | Vo et al. |
| 2016/0272875 A1 | 9/2016 | Ghumare et al. |
| 2016/0362599 A1 | 12/2016 | Wadekar et al. |
| 2017/0009122 A1 | 1/2017 | Funkhouser et al. |
| 2017/0130554 A1 | 5/2017 | Jones et al. |
| 2017/0137562 A1 | 5/2017 | Zheng et al. |
| 2017/0247607 A1 | 8/2017 | Hundt |
| 2017/0349804 A1 | 12/2017 | Kellum et al. |
| 2017/0350212 A1 | 12/2017 | Sabins et al. |
| 2018/0066489 A1 | 3/2018 | Pipchuk et al. |
| 2018/0216437 A1* | 8/2018 | Shafer ............... E21B 47/00 |
| 2018/0346801 A1 | 12/2018 | Dandawate et al. |
| 2019/0249067 A1 | 8/2019 | Wagle et al. |
| 2020/0024503 A1* | 1/2020 | Watters ............... C04B 40/0039 |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A1 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

Morris et al., "Resin-Based Cement Alternatives for Deepwater Well Construction", Society of Petroleum Engineers, SPE-155613-MS, 2012.

Melson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Sep. 17, 2019 pertaining to U.S. Appl. No. 16/117,902, filed Aug. 30, 2018, 26 pgs.

Office Action dated Sep. 30, 2019 pertaining to U.S. Appl. No. 16/117,974, filed Aug. 30, 2018, 35 pgs.

Office Action dated Nov. 13, 2019 pertaining to U.S. Appl. No. 16/515,673, filed Jul. 18, 2019, 23 pgs.

Office Action dated Nov. 18, 2019 pertaining to U.S. Appl. No. 16/117,950, filed Aug. 30, 2018, 22 pgs.

Destari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

Elyas, O. et al. "Use of Polymer Resins for Surface Annulus Isolation Enhancement" SPE-192266-MS, Society of Petroleum Engineers, Apr. 26, 2018, pp. 1-8.

Al-Yami, A. et al. "Optimum Practices to Mitigate Gas Migration Problems in Deep Gas Wells" SPE-187700-MS, Society of Petroleum Engineers, Oct. 18, 2017, pp. 1-21.

Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.

International Search Report and Written Opinion dated Nov. 7, 2019 pertaining to International application No. PCT/US2019/047846 filed Aug. 23, 2019.

International Search Report and Written Opinion dated Nov. 7, 2019 pertaining to International application No. PCT/US2019/047842 filed Aug. 23, 2019.

Final Rejection pertaining to U.S. Appl. No. 16/117,902 dated Jan. 17, 2020.

Office Action dated Mar. 10, 2020 pertaining to U.S. Appl. No. 16/117,974, filed Aug. 30, 2018, 39 pgs.

(56) References Cited

OTHER PUBLICATIONS

Notice of Allowance and Fee(s) Due dated Mar. 12, 2020 pertaining to U.S. Appl. No. 16/117,950, filed Aug. 30, 2018, 16 pgs.

International Search Report and Written Opinion dated Jul. 23, 2020 pertaining to International application No. PCT/US2020/028050 filed Apr. 14, 2020, 15 pgs.

International Search Report and Written Opinion dated Jul. 23, 2020 pertaining to International application No. PCT/US2020/028082 filed Apr. 14, 2020, 15 pgs.

Notice of Allowance and Fee(s) Due dated Dec. 10, 2020 pertaining to U.S. Appl. No. 16/809,892, filed Mar. 5, 2020, 14 pgs.

International Search Report and Written Opinion dated Dec. 11, 2020 pertaining to International application No. PCT/US2020/050616 filed Sep. 14, 2020, 13 pgs.

Notice of Allowance and Fee(s) Due dated Dec. 30, 2020 pertaining to U.S. Appl. No. 16/809,822, filed Mar. 5, 2020, 13 pgs.

Office Action dated May 8, 2020 pertaining to U.S. Appl. No. 16/515,673, filed Jul. 18, 2019, 41 pgs.

Office Action dated Oct. 6, 2020 pertaining to U.S. Appl. No. 16/809,892, filed Mar. 5, 2020, 44 pgs.

Office Action dated Oct. 6, 2020 pertaining to U.S. Appl. No. 16/809,822, filed Mar. 5, 2020, 44 pgs.

Office Action dated Nov. 17, 2020 pertaining to U.S. Appl. No. 16/117,974, filed Aug. 30, 2018, 46 pgs.

Office Action dated Jun. 24, 2020 pertaining to U.S. Appl. No. 16/117,974, filed Aug. 30, 2018, 41 pgs.

Office Action dated Mar. 11, 2021 pertaining to U.S. Appl. No. 16/117,974, filed Aug. 30, 2018, 43 pgs.

Office Action dated Jan. 27, 2021 pertaining to U.S. Appl. No. 16/826,989, filed Mar. 23, 2020, 58 pgs.

Office Action dated Feb. 18, 2021 pertaining to U.S. Appl. No. 16/718,716, filed Dec. 18, 2019, 66 pgs.

Office Action dated May 7, 2021 pertaining to U.S. Appl. No. 16/117,902, filed Aug. 30, 2018, 76 pages.

Office Action dated May 21, 2021 pertaining to U.S. Appl. No. 16/826,989, filed Mar. 23, 2020, 25 pages.

International Search Report and Written Opinion dated Jun. 1, 2021 pertaining to International application No. PCT/US2021/018660 filed Feb. 19, 2021, 14 pages.

U.S. Office Action dated Jul. 23, 2021 pertaining to U.S. Appl. No. 16/718,716, filed Dec. 18, 2019, 28 pages.

Notice of Allowance and Fee(s) Due dated Aug. 12, 2021 pertaining to U.S. Appl. No. 16/117,974 filed Aug. 30, 2018, 14 pages.

Notice of Allowance and Fee(s) Due dated Aug. 3, 2021 pertaining to U.S. Appl. No. 16/826,989 filed Mar. 23, 2020, 14 pages.

* cited by examiner

SEALING COMPOSITIONS AND METHODS OF PLUGGING AND ABANDONING OF A WELLBORE

CROSS-REFERENCE TO RELATED APPLICATIONS

This application claims the benefit of U.S. Provisional Application Ser. No. 62/981,187 filed Feb. 25, 2020, the entire disclosure of which is hereby incorporated herein by reference.

TECHNICAL FIELD

Embodiments of the present disclosure generally relate to natural resource well drilling and, more specifically, to sealing compositions and methods for plugging and abandoning a wellbore.

BACKGROUND

Extracting subterranean hydrocarbon sources may require drilling a hole from the surface to the subterranean geological formation housing the hydrocarbons. Specialized drilling techniques and materials are utilized to form the bore hole and extract the hydrocarbons. Specialized materials utilized in drilling operations include materials for sealing the casing-casing annulus of the wellbore and for plugging and abandonment operations.

Plugging and abandonment operations occur at the conclusion of a well's production life, when the well must be plugged and abandoned. During plug-and-abandon operations, a conventional plugging composition (for example, Portland cement, kiln dust, fly ash, slag cement, shale, etc.) is placed in the well at a desired depth. The plugging composition or "plugging cement" is pumped or circulated into the well, where it sets, forming a hardened mass (for example, a plug) that seals off selected intervals of the well. The plugs of the plugging and abandonment operations may serve several purposes, including but not limited to sealing parts of the wellbore against future fluid migration, protecting aquifers from contaminations, or permanently closing the well in case of no future utility is identified.

SUMMARY

As the number of wells reaching the end of their production lives increases, there is an increase in concern and regulation regarding the potential environmental impact of abandoned wells. Additionally, conventional plugging compositions, such as cements, can only withstand pressures in a range of from 500 psi to 5,000 psi, which may result in a failure to provide effective zonal isolation or reliably plug and abandon a wellbore when pressures within the wellbore exceed those limits. Therefore, there are needs for sealing compositions that ensure the integrity of the plugs in plugging and abandonment operations.

Embodiments of the present disclosure meet those needs by providing a sealing composition that includes an epoxy resin system to plug and abandon a well. The epoxy resin system includes at least two epoxy resins and at least one curing agent. This system can act as an option to permanently isolate or seal off the desired zones to prevent future migration of downhole fluids. As described in greater detail subsequently in this disclosure, the epoxy resin system may have density and rheological properties that allow the sealing composition to be relatively more resistive to corrosive fluids than conventional cements used for plugging and abandonment operations. Additionally, embodiments of the presently-described epoxy resin system may be able to withstand pressures in a range of from 7,000 pounds per square inch (psi) to 15,000. Therefore, the presently-described sealing compositions may provide effective zonal isolation to reliably plug and abandon a wellbore.

According to some embodiments, methods of plugging and abandoning a wellbore are provided. Embodiments of the method for plugging and abandoning a wellbore may include introducing a sealing composition into a wellbore and curing the sealing composition to form a plug. The sealing composition may include from 1 weight percent to 20 weight percent of a curing agent, based on the total weight of the composition, and from 20 weight percent to 97 weight percent of an epoxy resin system, based on the total weight of the composition. The epoxy resin system may include an epoxy resin having the formula $(OC_2H_3)$—$CH_2$—O—$R^1$—O—$CH_2$—$(C_2H_3O)$, where $R^1$ is a linear or branched hydrocarbyl having from 4 to 24 carbon atoms; and a reactive diluent having the formula R—O—$CH_2$—$(C_2H_3O)$, where R is a hydrocarbyl having from 12 to 14 carbon atoms.

These and other embodiments are described subsequently in more detail in the Detailed Description.

DETAILED DESCRIPTION

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" refers to a fluid utilized to space apart any two other materials utilized in well production.

As used throughout this disclosure, the term "wellbore" may refer to a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, the term "fluid conduit" may be defined by one or more tubular strings having at least two openings (typically on opposing ends) with an enclosing surface having an interior and exterior surface. The interior surface acts to define the bounds of the fluid conduit. Examples of tubular strings and portions of tubular strings used in the wellbore as fluid conduits or for making or extending fluid conduits include casing, production liners, coiled tubing, pipe segments, tubes, pipe strings, mechanical structures with interior voids, or combinations of these. A tubular string may include an assembly of several shorter tubular strings connected to one another, such as joined pipe segments or casing.

As used throughout this disclosure, the term "wellbore annulus" may refer to the volume between the exterior surfaces of the tubular string and the wellbore wall, when positioning a tubular string or a portion of a tubular string in the wellbore. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material in the wellbore annulus or the casing-casing annulus to seal the annulus.

As used throughout this disclosure, the term "primary sealing" refers to the process of initially sealing the annulus upon installation of the casing or other tubular string and may refer to initial sealing of the annulus between the exterior surface of the tubular string and the wellbore wall of the wellbore or initial sealing of a casing-casing annulus between two tubular strings installed in the wellbore. Primary sealing may form a protective solid sheath around the exterior surface of the tubular string, which may anchor and support the tubular string in the wellbore and protect the tubular string from corrosion caused by fluids from the hydrocarbon-containing formation. Primary sealing may also provide a hydraulic seal in the annulus that may prevent migration of gases and liquids from one side of the solid hydraulic seal to the other. This hydraulic seal may prevent fluid communication between production zones in the wellbore, referred to as zonal isolation, or may prevent migration of fluids to the surface. Primary sealing in conventional wellbore installations are performed with cement compositions and, thus, may be commonly referred to as "primary cementing."

As used throughout this disclosure, the term "lost circulation zone" may refer to a zone where drilling fluid, sealing compositions, or both flow from the wellbore into the subterranean formation, resulting in loss of the drilling fluid or sealing composition from the drilling process. In some instances, lost circulation may be caused by the natural state of the formation through which the drilling passes. For example, the subterranean formation may be naturally fractured or may be an unconsolidated formation, such as gravel, sand, pea, or other unconsolidated material. Alternatively, in other situations, the hydrostatic pressure of the drilling fluid or sealing composition may be greater than the fracture gradient of the subterranean formation, which may cause the at least some breakdown of the pores in the formation. If the pores in the formation breakdown enough, then the pores become big enough to receive the fluids from the wellbore rather than resisting flow of these fluids.

As used throughout this disclosure, the term "low-injectivity zones" refers to zones in which it is not possible to inject materials containing solid particles. Low-injectivity zones may include zones having an injectivity factor of greater than 4000 pounds of force per square inch·min per barrel (psi-min/bbl), or even greater than 6000 psi-min/bbl. The term "barrel" refers to a unit of measure equal to 42 U.S. Gallons. The injectivity factor is defined as the quotient of the injection pressure in pounds of force per square inch (psi) divided by the injection rate in barrels per minute (bbl/min). These low-injectivity zones may include, but are not limited to, tight fractures comprising very narrow microcracks from the wellbore into the subterranean formation and areas in which the annular distance between casings is tight. In low-injectivity zones, the average width of the microcracks in the formation or the annular distance between casings may be less than 100 microns, such as less than 50 microns, or even less than 10 microns. In these low-injectivity zones, solids particles in material compositions, such as conventional cement compositions, may cause blockage and prevent the cement or material other material compositions from being injected into the zone. For example, cement compositions and other conventional materials for remediating lost circulation zones include greater concentrations of solids and are not generally injectable into low-injectivity zones. Low-injectivity zones require the use of materials that are substantially free of solids or solid particles. As used in this disclosure, the term "substantially free" of a constituent means less than 1 weight percent (wt. %) of that component in a particular portion of a composition, such as a drilling fluid, sealing composition, lost circulation material, spacer fluid, cleaning fluid, or other material. As an example, a lost circulation material that is substantially free of solids may have less than 1 wt. % solids based on the total weight of the lost circulation material.

Reference will now be made to embodiments of the present disclosure, which are directed to sealing compositions and methods of plugging and abandoning a wellbore using the sealing compositions. Once cured, the sealing compositions may act as a barrier to prevent fluids, such as liquids and gases, from migrating through the sealing composition to the surface or into the production pipe of the well. The mechanical properties of the sealing composition may make the sealing composition relatively less brittle and provide a greater deformation capacity compared to conventional cement compositions. In addition, the sealing compositions that include the epoxy resin system, prior to curing, may have beneficial rheological properties to enable the sealing composition to transmit hydrostatic pressure to the formation during the plugging and abandonment operations to prevent fluid flow from the subterranean hydrocarbon-bearing formation into the wellbore. As discussed subsequently in this disclosure, the sealing compositions can be prepared with different density, viscosity, and mechanical properties by changing the concentration of the epoxy resins or curing agent. For example, the sealing composition can be designed to produce a final cured epoxy that is rigid or flexible, as needed. Thus, the epoxy resin system may be adapted for use in different conditions during plugging and abandonment operations.

Also, in some embodiments, the sealing compositions that include the epoxy resin system may be substantially free of solids, which may make the sealing compositions suitable for low-injectivity zones, for which conventional cement compositions cannot be used. The sealing compositions with the epoxy resin system may have reduced density compared to conventional cement compositions, which makes the sealing composition more suitable for narrow fracture pressure gradient zones compared to the conventional cement compositions.

Embodiments of the sealing compositions may include an epoxy resin system comprising at least two epoxy resins and a curing agent. Without being bound by theory, it is believed the combination of one epoxy resin having two epoxy groups with another epoxy resin having one epoxy group may reduce the viscosity of the overall epoxy resin system. In embodiments, the epoxy resin having one epoxy group may act as a reactive diluent that lowers the overall viscosity of the epoxy resin system. Additionally, the combination of these at least two epoxy resins may impart resiliency and elasticity to the cured epoxy resin system.

In embodiments, the epoxy resin system may include an epoxy resin having two epoxy groups. In further embodiments, the epoxy resin having two epoxy groups may include propylene glycol diglycidyl ether, butanediol diglycidyl ether, bisphenol-A-based epoxy resins, bisphenol-F-based epoxy resins, aliphatic epoxy resins, Novalac resins, or combinations of these epoxy resins. Aliphatic epoxy resins may have formula (I):

$$(OC_2H_3)-CH_2-O-R^1-O-CH_2-(C_2H_3O) \qquad (I)$$

where $R^1$ may be a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. In some embodiments, $R^1$ may be an alkyl group. For example, in one embodiment, the epoxy resin system may include 1,6-hexanediol diglycidyl ether, which has formula (II):

$$(OC_2H_3)-CH_2-O-C_6H_{12}-O-CH_2-(C_2H_3O) \quad \text{(II)}$$

In some embodiments, the epoxy resin system may include at least one of 1,6-hexanediol diglycidyl ether, alkyl glycidyl ethers having from 12 to 14 carbon atoms, 2,3-epoxypropyl o-tolylether, or bisphenol-A-epichlorohydrin epoxy resin. In other embodiments, the epoxy resin system may include at least one of 1,6-hexanediol diglycidyl ether, alkyl glycidyl ethers having from 12 to 14 carbon atoms, or 2,3-epoxypropyl o-tolyl ether.

The epoxy resin system may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

When used for a sealing composition, in some embodiments, the epoxy resin having two epoxy groups may have a viscosity that enables the sealing composition to provide effective zonal isolation or reliably plug a wellbore during a plugging and abandonment operation. In some embodiments, the epoxy resin system may have a viscosity of from 60 millipascal seconds (mPa·s) to 1,000 mPa·s, from 60 mPa·s to 500 mPa·s, from 60 mPa·s to 100 mPa·s, from 100 mPa·s to 1,000 mPa·s, from 100 mPa·s to 500 mPa·s, or from 500 mPa·s to 1,000 mPa·s.

In embodiments, the epoxy resin system may include an epoxy resin having one epoxy group, which may be referred to as a reactive diluent. The reactive diluent may be a "functional" reactive diluent, meaning that it includes at least one epoxide functional group. In further embodiments, the reactive diluent may be a "mono-functional" reactive diluent, meaning that it includes one epoxide functional group. Examples of reactive diluents may include, but are not limited to, cardanol glycidyl ether derivatives, aliphatic monoglycidyl ethers of $C_{13}$-$C_{15}$ alcohols, or combinations. In some embodiments, the epoxy resin system may include a reactive diluent having the formula (III):

$$R^2-O-CH_2-(C_2H_3O) \quad \text{(III)}$$

where $R^2$ is a hydrocarbyl having from 12 to 14 carbon atoms. $R^2$ may be linear, branched, or cyclic. In some embodiments, $R^2$ may be an alkyl group.

The type and amount of reactive diluent may influence the viscosity, flexibility, hardness, chemical resistance, mechanical properties, plasticizing effect, reactivity, cross-linking density, or other properties of the epoxy resin system. In some embodiments, the reactive diluent may be added to the epoxy resin system to change the viscosity of the epoxy resin system, such as to reduce the viscosity of the epoxy resin system. In other embodiments, the reactive diluents may improve at least one of the adhesion, the flexibility, and the solvent resistance of the epoxy resin system.

In some embodiments, the epoxy resin system may include an amount of reactive diluent that reduces the viscosity of the epoxy resin system. In other embodiments, the epoxy resin system may include an amount of reactive diluent that modifies one or more of the adhesion, the flexibility, or the solvent resistance of the epoxy resin system. In some embodiments, the epoxy resin may include from 1 wt. % to 99 wt. % reactive diluent based on the total weight of the epoxy resin portion of the epoxy resin system. As used in this disclosure, the term "epoxy resin portion" refers to the constituents of the epoxy resin system that do not include the curing agent, weighting agents, or other additives, such as accelerators or retarders. The epoxy resin portion may include the epoxy resin having two epoxy groups and the reactive diluent. In other embodiments, the epoxy resin portion may include from 1 wt. % to 99 wt. %, from 1 wt. % to 75 wt. %, from 1 wt. % to 50 wt. %, from 1 wt. % to 25 wt. %, from 25 wt. % to 99.9 wt. %, from 25 wt. % to 75 wt. %, from 25 wt. % to 50 wt. %, from 50 wt. % to 99.9 wt. %, from 50 wt. % to 75 wt. %, or from 75 wt. % to 99.9 wt. % epoxy resin having two epoxy groups based on the total weight of the epoxy resin portion of the epoxy system. Likewise, the epoxy resin portion may include from 1 wt. % to 99 wt. %, from 1 wt. % to 75 wt. %, from 1 wt. % to 50 wt. %, from 1 wt. % to 25 wt. %, from 25 wt. % to 99.9 wt. %, from 25 wt. % to 75 wt. %, from 25 wt. % to 50 wt. %, from 50 wt. % to 99.9 wt. %, from 50 wt. % to 75 wt. %, or from 75 wt. % to 99.9 wt. % reactive diluent based on the total weight of the epoxy resin portion of the epoxy system.

In some embodiments, the epoxy resin may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the epoxy resin system and improve the adhesion, flexibility, and solvent resistance of the final epoxy resin system. The bisphenol-A-(epichlorohydrin) epoxy resin with the reactive diluent oxirane mono [($C_{12}$-$C_{14}$)-alkyloxy) methyl] derivatives may modify the viscosity of the sealing compositions or may provide the sealing composition with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin system may include from 80 wt. % to 90 wt. %, from 80 wt. % to 88 wt. %, from 80 wt. % to 86 wt. %, from 80 wt. % to 84 wt. %, from 82 wt. % to 90 wt. %, from 82 wt. % to 88 wt. %, from 82 wt. % to 86 wt. %, from 82 wt. % to 84 wt. %, from 84 wt. % to 90 wt. %, from 84 wt. % to 88 wt. %, or from 84 wt. % to 86 wt. % of the bisphenyl-A-epichlorohydrin epoxy resin based on the total weight of the epoxy resin system. In some embodiments, the epoxy resin system may include from 10 wt. % to 20 wt. %, from 10 wt. % to 18 wt. %, from 10 wt. % to 16 wt. %, from 10 wt. % to 14 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, or from 14 wt. % to 16 wt. % oxirane mono[($C_{12}$-$C_{14}$)-alkyloxy)methyl] derivatives based on the total weight of the epoxy resin portion of the epoxy resin system.

In some embodiments, the epoxy resin comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. Embodiment of the epoxy resin system including the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 60 millipascal seconds (mPa·s) to 1000 mPa·s, or 60 mPa·s to 500 mPa·s.

In some embodiments, the epoxy resin system may include 2,3-epoxypropyl-o-tolyl ether, which may have an epoxy equivalent weight of from 170 g/eq to 190 g/eq and exhibit a dynamic viscosity of from 7 mPa·s to 10 mPa·s. In other embodiments, the epoxy resin system may include alkyl glycidyl ethers having from 12 to 14 carbon atoms, which may have an epoxy equivalent weight of from 270 g/eq to 305 g/eq and may exhibit a dynamic viscosity of from 5 mPa·s to 12 mPa·s. In some embodiments, the epoxy resin system may include 1,6-hexanediol diclycidyl ether, which may have an epoxy equivalent weight of from 150 g/eq to 170 g/eq and may exhibit a dynamic viscosity of from 20 mPa·s to 30 mPa·s.

In some embodiments, the sealing composition may include an amount of the epoxy resin system necessary to form a cured epoxy composition. For example, in some embodiments, the sealing composition may include from 70 wt. % to 99.9 wt. % epoxy resin system based on the total weight of the sealing composition before curing. In other embodiments, the sealing composition may include from 70 wt. % to 90 wt. %, from 70 wt. % to 80 wt. %, from 80 wt. % to 99.9 wt. %, from 80 wt. % to 90 wt. %, or from 90 wt. % to 99.9 wt. % epoxy resin system based on the total weight of the sealing composition before curing.

As previously discussed in this disclosure, the epoxy resin system includes a curing agent. The curing agent may include at least one of an amine, polyamine, amine adduct, polyamine adduct, alkanolamine, amide, polyamide, polyamide adduct, polyamide imidazoline, polyaminoamides, phenalkamine, or combinations of these. Amines or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), or combinations of these. In other embodiments, the curing agent may include at least one of DETA, TETA, TEPA, IPDA, or combinations of these. In some embodiments, the epoxy resin system may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1 (EQU. 1):

$$\frac{V_{HCl} * N_{HCl} * MW_{KOH}}{W} \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

The curing time of the sealing composition may be inversely proportional to the amount of curing agent in the sealing composition. For example, increasing the amount of the curing agent in the sealing composition may result in a decrease in the curing time of the sealing composition. In some embodiments, the sealing composition may include an amount of curing agent capable of curing the epoxy resin portion to a semi-solid state in a cure time of from 4 hours to 12 hours. As used in this disclosure, the term "semi-solid" refers to a state of the compositions that is between a liquid and a solid in which the composition exhibits high elasticity and flexibility. In the semi-solid state, the sealing composition may be easily deformed but may return to shape upon releasing the deforming force. The sealing compositions cured to a semi-solid or solid state are capable of sealing the wellbore for plugging and abandoning operations.

In some embodiments, the sealing composition may include an amount of the curing agent capable of curing the epoxy resin system to a semi-solid state within a cure time of from 0.5 to 12 hours, from 0.5 hours to 10 hours, from 0.5 hours to 8 hours, from 0.5 hours to 6 hours, from 0.5 hours to 4 hours, from 0.5 hours to 2 hours, from 0.5 hours to 1 hour, from 1 to 12 hours, from 1 hours to 10 hours, from 1 hours to 8 hours, from 1 hours to 6 hours, from 1 hours to 4 hours, from 1 hours to 2 hours, from 2 to 12 hours, from 2 hours to 10 hours, from 2 hours to 8 hours, from 2 hours to 6 hours, from 2 hours to 4 hours, from 4 to 12 hours, from 4 hours to 10 hours, from 4 hours to 8 hours, from 4 hours to 6 hours, from 6 to 12 hours, from 6 hours to 10 hours, from 6 hours to 8 hours, from 8 to 12 hours, from 8 hours to 10 hours, or from 10 hours to 12 hours.

In some embodiments, the sealing composition may include from 0.1 wt. % to 30 wt. % curing agent based on the total weight of the sealing composition before curing. In other embodiments, the sealing composition may have from 0.1 wt. % to 15 wt. %, from 0.1 wt. % to 10 wt. %, from 0.1 wt. % to 5 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 20 wt. %, from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, or from 10 wt. % to 20 wt. % curing agent based on the total weight of the sealing composition before curing.

The epoxy resin system may also include one or more additives to modify the speed of the reaction between the epoxy resins and the curing agent or modify other properties of the epoxy resin system, such as viscosity, yield point, or other rheological properties. For example, in some embodiments, the epoxy resin system may include an accelerator or a retarder to speed up or slow down the reaction between the epoxy resins and the curing agent. Accelerators may include, but are not limited to, alcohols, phenols, aminoalcohols, or amines. Examples of accelerators may include, but are not limited to benzyl alcohol, mono-nonylphenol, triethanolamine (TEA), amino-n-propyl diethanolamine, n,n-dimethyldipropylenetramine, or combinations of these. Examples of retarders may include lignin, gums, starches, lignosulphonate derivatives, or combinations of these.

In some embodiments, the sealing composition may include an amount of the accelerator capable of decreasing the cure time of the sealing composition from 0.5 to 12 hours, from 0.5 hours to 10 hours, from 0.5 hours to 8 hours, from 0.5 hours to 6 hours, from 0.5 hours to 4 hours, from 0.5 hours to 2 hours, from 0.5 hours to 1 hour, from 1 to 12 hours, from 1 hours to 10 hours, from 1 hours to 8 hours, from 1 hours to 6 hours, from 1 hours to 4 hours, from 1 hours to 2 hours, from 2 to 12 hours, from 2 hours to 10 hours, from 2 hours to 8 hours, from 2 hours to 6 hours, from 2 hours to 4 hours, from 4 to 12 hours, from 4 hours to 10 hours, from 4 hours to 8 hours, from 4 hours to 6 hours, from 6 to 12 hours, from 6 hours to 10 hours, from 6 hours to 8 hours, from 8 to 12 hours, from 8 hours to 10 hours, or from 10 hours to 12 hours. In some embodiments, the sealing composition may include from 0.01 wt. % to 10 wt. % accelerator based on the total weight of the sealing composition prior to curing. In other embodiments, the sealing composition may include from 0.01 wt. % to 5 wt. %, from 0.01 wt. % to 3 wt. %, from 0.01 wt. % to 1 wt. %, from 0.1 wt. % to 10 wt. %, from 0.1 wt. % to 5 wt. %, from 0.1 wt. % to 3 wt. %, from 0.1 wt. % to 1 wt. %, from 1 wt. % to 10 wt. %, from 1 wt. % to 5 wt. %, or from 1 wt. % to 3 wt. % accelerator based on the total weight of the sealing composition prior to curing.

The sealing compositions may include one or more weighting materials. The weighting materials may be particulate solids having a specific gravity (SG) that increases the density of the sealing composition. The weighting material may be added to the sealing composition to increase the density of the final cured resin to increase the hydrostatic pressure exerted by the sealing composition on the wellbore wall. The final density of the cured resin may depend on the geology of the subterranean formation in the zone being sealed. For example, in some embodiments, the subterranean formation may require a sealing composition with a greater density to support the wellbore and prevent flow of fluids from the subterranean formation into the wellbore during curing of the sealing composition.

The weighting material may have a specific gravity (SG) of from 2 to 6. Examples of weighting materials may include, but are not limited to, sand, barite (barium sulfate), hematite, calcium carbonate, siderite, ilmenite, silica sand, manganese oxide (MnO), hausmanite (manganese tetraoxide ($Mn_3O_4$)), zinc oxide, zirconium oxide, iron oxide, fly ash, or any combination of these weighting materials. In some embodiments, sealing composition may include manganese tetraoxide.

The sealing composition may include an amount of weighting material that increases the density of the sealing composition. In some embodiments, the sealing composition may include from 0.1 wt. % to 40 wt. % weighting material based on the total weight of the sealing composition prior to curing. For example, in some embodiments, the sealing composition may include from 0.1 wt. % to 30 wt. %, from 0.1 wt. % to 20 wt. %, from 0.1 wt. % to 10 wt. %, from 1 wt. % to 40 wt. %, from 1 wt. % to 30 wt. %, from 1 wt. % to 20 wt. %, from 1 wt. % to 10 wt. %, from 5 wt. % to 40 wt. %, from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, or from 20 wt. % to 40 wt. % weighting material based on the total weight of the sealing composition before curing.

In some embodiments, the epoxy resin system may include other modifiers, such as cardanol liquid, polyacrylate flow agents, or combinations of these. Modifiers may be added to the epoxy resin system to decrease the viscosity of the epoxy resin.

The epoxy resins in the epoxy resin system are initially in liquid form. Upon combining the epoxy resins with the curing agents, the epoxy resins react with the curing agents to transform into a semi-solid or solid epoxy resin. Transition of epoxy resin from a liquid to a solid involves formation of covalent bonds via cross-linking reactions that initially build viscosity in the sealing compositions. Thus, during the curing process in which the epoxy resins transform from liquid to solid through cross-linking, the buildup of viscosity in the sealing compositions may enable the sealing compositions to continue to transmit hydrostatic pressure to the hydrocarbon-bearing formation. At a crossover point in the curing process, the epoxy resins may begin to form into a non-porous three-dimensional network. As this non-porous three-dimensional network begins to form, the epoxy resin continues to transmit hydrostatic pressure to the formation until an impermeable barrier of cured epoxy resin forms.

The sealing composition may have a cure time that enables the sealing composition to form a plug during a plugging and abandonment process. In some embodiments, the sealing composition may have a cure time of from 0.5 to 12 hours, from 0.5 hours to 10 hours, from 0.5 hours to 8 hours, from 0.5 hours to 6 hours, from 0.5 hours to 4 hours, from 0.5 hours to 2 hours, from 0.5 hours to 1 hour, from 1 to 12 hours, from 1 hours to 10 hours, from 1 hours to 8 hours, from 1 hours to 6 hours, from 1 hours to 4 hours, from 1 hours to 2 hours, from 2 to 12 hours, from 2 hours to 10 hours, from 2 hours to 8 hours, from 2 hours to 6 hours, from 2 hours to 4 hours, from 4 to 12 hours, from 4 hours to 10 hours, from 4 hours to 8 hours, from 4 hours to 6 hours, from 6 to 12 hours, from 6 hours to 10 hours, from 6 hours to 8 hours, from 8 to 12 hours, from 8 hours to 10 hours, or from 10 hours to 12 hours. In some embodiments, the sealing composition may have a cure time of less than or equal to 12 hours, less than or equal to 10 hours, or even less than or equal to 9 hours.

The sealing compositions may be capable of withstanding a wide range of temperatures and pressures without failing or deteriorating. Failure or deterioration of the sealing composition may allow liquids or gases to penetrate into or through the sealing composition. For example, the sealing compositions, once cured, may be capable of withstanding temperatures of from 20 degrees Celsius (° C.) to 205° C. The cured sealing compositions may also be able to withstand temperature cycling within a temperature range of from 20° C. to 205° C. The cured sealing composition may be capable of withstanding pressures of up to 4,000,000 pounds of force per square inch (psi) (1 psi equals 6.89476 kilopascals (kPa)). For example, in some embodiments, the cured sealing composition may be capable of withstanding pressures of from 14 psi to 4,000,000 psi without failing or deteriorating to allow liquids or gases to penetrate into or through the sealing composition.

The rheology and density of the sealing compositions can be adjusted over a wide range of values depending on the requirement for the well and the downhole conditions of the well. The sealing composition may have a density that enables the sealing composition to exert hydrostatic pressure on the wellbore wall or interior surface of an outer casing to support the wellbore, prevent fluids from flowing from the subterranean formation into the wellbore, or both. In some embodiments, the sealing composition may have a density of from 55 pounds per cubic foot (lbm/ft$^3$) to 170 lbm/ft$^3$ measured immediately after addition of the curing agent and before substantial curing has occurred. As used in this disclosure, the term "substantial curing" refers to an amount of curing that produces a change of greater than 5 percent (%) in any rheological property of the composition. In some embodiments, the sealing composition may have a density of from 55 lbm/ft$^3$ to 150 lbm/ft$^3$, from 55 lbm/ft$^3$ to 130 lbm/ft$^3$, from 55 lbm/ft$^3$ to 110 lbm/ft$^3$, from 55 lbm/ft$^3$ to 90 lbm/ft$^3$, from 60 lbm/ft$^3$ to 170 lbm/ft$^3$, from 60 lbm/ft$^3$ to 150 lbm/ft$^3$, from 60 lbm/ft$^3$ to 130 lbm/ft$^3$, from 60 lbm/ft$^3$ to 110 lbm/ft$^3$, from 60 lbm/ft$^3$ to 90 lbm/ft$^3$, from 80 lbm/ft$^3$ to 170 lbm/ft$^3$, from 80 lbm/ft$^3$ to 130 lbm/ft$^3$, from 80 lbm/ft$^3$ to 110 lbm/ft$^3$, from 90 lbm/ft$^3$ to 150 lbm/ft$^3$, or from 90 lbm/ft$^3$ to 130 lbm/ft$^3$. In some embodiments, the sealing composition may have a density of from 55 pounds per cubic foot (lbm/ft$^3$) to 170 lbm/ft$^3$ measured immediately after addition of the curing agent and before substantial curing has occurred.

For plugging and abandonment operations, the sealing composition may be formulated to have reduced resistance to flow compared to conventional cements used for plugging and abandonment operations. The reduced resistance to flow of the sealing composition may enable the sealing composition to be easily transferred into the annulus. In some embodiments, the sealing composition may have a viscosity that enables the sealing composition to exert hydrostatic pressure on the wellbore wall or interior surface of an outer casing to support the wellbore, prevent fluids from flowing from the subterranean formation into the wellbore, or both. However, the viscosity of the sealing composition may be reduced to enable the sealing composition to be efficiently transported into the annulus. In some embodiments, the sealing composition may have a viscosity of from 1 millipascal second (mPa·s) to 50,000 mPa·s before curing. The viscosity of the sealing composition may be determined according to the methods subsequently provided in this disclosure. In some embodiments, the sealing composition may have a viscosity of from 60 mPa·s to 1,000 mPa·s, from 60 mPa·s to 500 mPa·s, from 60 mPa·s to 100 mPa·s, from 100 mPa·s to 1,000 mPa·s, from 100 mPa·s to 500 mPa·s, or from 500 mPa·s to 1,000 mPa·s measured immediately after addition of the curing agent and before substantial curing has taken place.

The sealing composition may have a gel strength before curing that maintains the pump-ability of the sealing composition to prevent stuck-pipe problems. The gel strength refers to the shear stress of a fluid measured at a reduced shear rate following a defined period of time during which the fluid is maintained in a static state. In some embodiments, the sealing composition may have a density of greater than 100 lbm/ft$^3$ or greater than 120 lbm/ft$^3$, and the gel strength may enable the sealing composition to suspend the weighting agents in sealing composition added to increase the density. In some embodiments, the sealing compositions may have a 10-second gel strength of from 0.1 pound of force per square foot (lbf/100 ft$^2$) to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 20 lbf/100 ft$^2$, from 5 lbf/100 ft$^2$ to 10 lbf/100 ft$^2$, or from 0.1 lbf/100 ft$^2$ to 1 lbf/100 ft$^2$ measured immediately after addition of the curing agent and before substantial curing has taken place. In some embodiments, the sealing composition may have a 10-minute gel strength of from 0.1 lbf/100 ft$^2$ to 30 lbf/100 ft$^2$, from 0.1 lbf/100 ft$^2$ to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 30 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 30 lbf/100 ft$^2$, from 5 lbf/100 ft$^2$ to 2 lbf/100 ft$^2$, from 5 lbf/100 ft$^2$ to 10 lbf/100 ft$^2$, from 10 lbf/100 ft$^2$ to 30 lbf/100 ft$^2$, from 10 lbf/100 ft$^2$ to 20 lbf/100 ft$^2$, or from 20 lbf/100 ft$^2$ to 30 lbf/100 ft$^2$ measured immediately after addition of the curing agent and before substantial curing has taken place. The 10-second gel strength and 10-minute gel strength may be measured according to the test methods subsequently described in this disclosure.

The plastic viscosity (PV) of a fluid relates to the resistance of a fluid to flow due to mechanical interaction between the solids of the fluid and represents the viscosity of the fluid extrapolated to infinite shear rate. The PV of the sealing composition may be measured immediately after addition of the curing agent and before substantial curing has taken place. The PV of the sealing composition may be determined in accordance with the test methods subsequently described in this disclosure. In some embodiments, the sealing composition may have a PV of from 0.1 centipoise (cP) to 50 cP, from 0.1 cP to 30 cP, from 0.1 cP to 20 cP, from 0.1 cP to 10 cP, from 1 cP to 50 cP, from 1 cP to 30 cP, from 1 cP to 20 cP, from 1 cP to 10 cP, from 5 cP to 50 cP, from 5 cP to 30 cP, from 5 cP to 20 cP, or from 5 cP to 10 cP measured immediately after addition of the curing agent and before substantial curing has taken place (1 cP=1 millipascal second (mPa-s)). The PV of the sealing composition may depend on the quantity of solids added to the sealing composition. For example, addition of weighting agents to the sealing composition to increase the density may also increase the PV of the sealing composition.

The yield point (YP) of a fluid relates to the amount of stress required to move the fluid from a static condition. Alternatively, in other embodiments, the sealing compositions may include weighting agents and may have a greater YP to enable the sealing compositions to suspend the weighting agents. In some embodiments, the sealing composition may have a YP of from 0.1 lbf/100 ft$^2$ to 400 lbf/100 ft$^2$, from 0.1 lbf/100 ft$^2$ to 300 lbf/100 ft$^2$, from 0.1 lbf/100 ft$^2$ to 200 lbf/100 ft$^2$, from 0.1 lbf/100 ft$^2$ to 100 lbf/100 ft$^2$, from 0.1 lbf/100 ft$^2$ to 10 lbf/100 ft$^2$, from 1 lbf/100 ft$^2$ to 400 lbf/100 ft$^2$, from 1 lbf/100 ft$^2$ to 300 lbf/100 ft$^2$, from 1 lbf/100 ft$^2$ to 200 lbf/100 ft$^2$, from 1 lbf/100 ft$^2$ to 100 lbf/100 ft$^2$, from 1 lbf/100 ft$^2$ to 10 lbf/100 ft$^2$, from 10 lbf/100 ft$^2$ to 400 lbf/100 ft$^2$, from 10 lbf/100 ft$^2$ to 300 lbf/100 ft$^2$, from 10 lbf/100 ft$^2$ to 200 lbf/100 ft$^2$, from 10 lbf/100 ft$^2$ to 100 lbf/100 ft$^2$, from 100 lbf/100 ft$^2$ to 400 lbf/100 ft$^2$, from 100 lbf/100 ft$^2$ to 300 lbf/100 ft$^2$, from 100 lbf/100 ft$^2$ to 200 lbf/100 ft$^2$, from 200 lbf/100 ft$^2$ to 400 lbf/100 ft$^2$, or from 300 lbf/100 ft$^2$ to 400 lbf/100 ft$^2$.

The epoxy resins, once cured, may be more chemically resistant than conventional cement compositions. For example, the fluids from the subterranean formation, such as hydrocarbon gases, crude oil, or produced water, may include hydrogen sulfide gas ($H_2S$), which is highly corrosive. In some embodiments, the cured epoxy resins incorporated into the sealing compositions may be resistant to corrosion caused by $H_2S$ gas present in fluids in the subterranean formation.

The sealing compositions described in this disclosure may be used in methods for plugging and abandoning of a wellbore. In embodiments, the methods may include introducing embodiments of the presently-disclosed sealing compositions into a wellbore and curing the sealing composition to form a plug. In some embodiments, the method may further include curing the sealing composition for at least 2 hours. Alternatively, in other embodiments, the method may include curing the sealing composition for a cure time of from 2 hours to 12 hours or from 4 hours to 12 hours.

In some embodiments of methods for plugging and abandoning of a wellbore, the methods may include identifying a plugging zone of the wellbore. The plugging zone may refer to the portion of the wellbore to be plugged, which may be within a low-injectivity zone, as previously defined in this disclosure. The method may further include running tubing through the wellbore to a plugged-back total depth (PBTD), which may refer to the depth from the surface of the well to the top of the last permanent plug. The method may further include cleaning the wellbore with a cleaning fluid prior to introducing the sealing composition. In further embodiments, the cleaning fluid may include brine. The method may further include introducing a spacer fluid into the wellbore, prior to introducing the sealing composition, subsequent to introducing the sealing composition, or both. Then, embodiments may include disassembling and pulling the tubing to a distance above the top of injected sealing composition. The speed at which the tubing is pulled may be limited, for example to 30 ft/min, to avoid contaminating the sealing composition. Once sealing composition has cured forming a plug, the method may include tagging the top of the plug. In further embodiments, the plug may be tagged after 24 hours since the sealing composition has cured.

Test Methods

Viscosity

The viscosity of the sealing compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft$^2$). The viscometer may also be used to measure the shear rate of the sealing compositions.

Gel Strength

The gel strength refers to the shear stress of the sealing composition measured at a reduced shear rate following a defined period of time during which the sealing composition is maintained in a static state. The shear stress of the composition at reduced shear rate may be measured using a standard oilfield viscometer, such as a FANN® Model 35 viscometer operated at reduced rpms, such as at 3 rpm, according to the test methods described in API Recommended Practice On Determining the Static Gel Strength of Cement Formulations (RP 10B-6/ISO 10426-6:2008). To measure the gel strength, the sealing composition is first stirred by contacting the composition with the spindle of the viscometer and operating the viscometer at 600 rotations per minute (rpm). The viscometer is then turned off for a period of time (time period). For a 10-second gel strength, the time period is 10 seconds, and for a 10-minute gel strength, the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the sealing composition is reported in units of pounds of force per 100 square feet (lbf/100 ft$^2$).

Plastic Viscosity and Yield Point

The rheology of the sealing compositions may be modeled based on Bingham plastic flow behavior. In particular, the sealing compositions may behave as a rigid body at lesser shear stress but flow as a viscous fluid at greater shear stress. The rheological behavior of the compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the sealing composition may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the sealing composition. The PV of the sealing composition may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the sealing compositions are provided in this disclosure in units of centipoise (cP).

$$PV = (\text{viscosity at 600 rpm}) - (\text{viscosity at 300 rpm}) \qquad \text{EQU. 3}$$

At shear stress less than the YP of the sealing composition, the sealing composition behaves as a rigid body, and at shear stress greater than the YP of the sealing composition, the sealing composition flows as a viscous fluid. In other words, the YP represents the amount of stress required to move a fluid from a static condition. The YP is determined by extrapolating the Bingham plastic rheology model to a shear rate of zero. The YP of the sealing composition may be estimated from the PV from EQU. 3 by subtracting the PV from the shear stress measured at 300 rpm according to Equation 4 (EQU. 4), which is provided subsequently.

$$YP = (300 \text{ rpm reading}) - PV \qquad \text{EQU. 4}$$

The YP is expressed as a force per area, such as pounds of force per one hundred square feet (lbf/100 ft$^2$) for example. The methods for measuring and determining PV and YP for the sealing compositions are consistent with methods conventionally used for drilling fluids in general.

Shear Bond Test

A shear bond test determines the force required to move a pipe through a column of set cement or a sealing composition. This shear bond strength can be used to determine the length of pipe a column of set cement or sealing composition can support. The shear bond test includes filling an annulus between two pieces of pipe with a cement slurry or a sealing composition and allowing it to set. After the cement or sealing composition sets, the outer pipe is supported on the bottom platen of a load press while force is applied to the center pipe by the load press. The load indication on the press increases until the bond breaks between the pipe and the cement or sealing composition. This loading force is converted to a force per unit area and is called the shear bond strength.

Preparing the Shear Bond Test Mold: The shear bond mold includes a bottom pipe-centering device, an outer sleeve, an inner pipe, and a top centering device. When assembled, the shear bond mold defines an annular space between the outer sleeve and the inner pipe. All pieces of the shear bond test mold are thoroughly cleaned before assembling the pieces for testing. Care should be taken to make sure the inner pipe and the outer sleeve do not have any mold release agents, such as oil or grease, in the areas in which the cement or sealing composition will contact. After cleaning, the bottom pipe-centering device is installed in the bottom of the outer sleeve. 0-rings may be used to seal the inner pipe and the outer sleeve. The inner pipe is installed in the bottom pipe-centering device and aligned with the outer sleeve such that the inner pipe and the outer sleeve are concentric.

Filling the Test Mold: The cement or sealing composition is prepared and mixed according to standard American Petroleum Institute (API) procedures (or appropriate procedures for specialized slurries). The cement or sealing composition, in the form of a slurry, is then poured into the annular space between the inner and outer pipe, while slowly stirring the slurry with a spatula to minimize the possibility of settling. The slurry is then puddled with a glass rod or spatula to remove any trapped air and the top centering device is placed on top of the slurry and in contact with the inner pipe and outer sleeve to center the inner pipe with respect to the outer sleeve. The bottom centering device and the top centering device cooperate to maintain the inner pipe center relative to the outer sleeve while the cement or sealing composition cures or sets.

Curing the Slurry: The shear bond test mold filled with the cement or sealing composition slurry is then placed in the curing medium, which can be a water bath or a pressure-curing chamber. The cement or sealing composition is then cured according to the appropriate test conditions in the same manner as for curing a compressive strength specimen. Before the end of the curing time, the test specimens are removed from the water bath and remove the test specimens, one at a time, from the water bath and, as quickly as possible, perform the following: (1) remove the top centering device from the curing mold; (2) remove the bottom centering device from the mold; (3) determine the height of the cement or sealing composition in contact with the inner pipe; and (4) place the test specimen back into the water bath and let the temperature stabilize for approximately 30 minutes before testing for shear bond strength. At the end of the curing period, the specimen should be maintained at the lesser of the curing temperature or a temperature of from 170 degrees Fahrenheit (° F.) (77 degrees Celsius (° C.)) to 190° F. (88° C.) until the specimen is tested. The specimen should not be allowed to cool to room temperature, because cooling to room temperature may cause thermal shrinkage of the specimen and mold, which can alter the test results. If the specimen is cured using a pressure-curing vessel, the pressure-curing vessel can be cooled to a temperature of from 170° F. (77° C.) and 190° F. (88° C.) and, if necessary, the test specimens can be removed from the pressure-curing vessel and placed into a water bath of the same temperature until the time of testing.

Testing for Shear Bond Strength: The press is adjusted so that the specimen fits between the top and bottom loading platens of the press. The test specimen is removed from the water bath and quickly placed between the loading platens with the outer sleeve in contact with the bottom loading platen and the inner pipe in contact with the upper loading platen. A loading force is applied to the test specimen by the press at a uniform rate (as in testing for compressive strength). When the shear bond breaks, the inner pipe moves downward through the set cement or sealing composition and the loading force begins to decrease. When the maximum force is reached before the pipe is moved and the force began to decrease, it is recorded and used to determine the shear bond strength.

The cement contact area is determined using Equation 5 (EQU. 5), which is subsequently provided in this disclosure.

$$CCA = CCH \times \pi \times D \qquad \text{EQU. 5}$$

In EQU. 5, CCA is the cement contact area in inches squared (in$^2$), CCH is the cement contact height on the pipe in inches (in), and D is the diameter of the pipe in inches (in). The diameter D in EQU. 5 will normally be the outside diameter of the inner pipe, however, if movement occurs between the set cement or sealing composition and the outer sleeve, the inside diameter of the outer sleeve may also be used calculating the cement contact area. The shear bond strength may then be calculated from Equation 6 (EQU. 6), which is subsequently provided in this disclosure.

$$SBS = \frac{MF}{CCA} \qquad \text{EQU. 6}$$

In EQU. 6, SBS is the shear bond strength in pounds per square inch (psi), MF is the maximum force applied to the test specimen in pounds of force (lbf), and CCA is the cement contact area in inches squared calculated from EQU. 5.

EXAMPLES

The following examples illustrate one or more features of the present disclosure. It should be understood that these examples are not intended to limit the scope of the disclosure or the appended claims in any manner.

In these Examples, four epoxy resins were evaluated for use in the sealing compositions described in the present disclosure. Table 1 is subsequently included in this disclosure and provides a cross-reference for the epoxy resins utilized.

TABLE 1

Cross-Reference of Epoxy Resins

| Epoxy Resin ID | Epoxy Resin Name |
| --- | --- |
| Resin 1 | bisphenol-A-epichlorohydrin epoxy resin with the reactive diluent oxirane mono [(C12-C14)-alkyloxy)methyl] derivatives |
| Resin 2 | 2,3-epoxypropyl-o-tolyl ether |
| Resin 3 | C12-C14 alkyl glycidyl ether |
| Resin 4 | 1,6-hexanediol diglycidyl ether |

Example 1: Rheological Properties of Epoxy Resins

Resins 1 through 4 were evaluated for rheological properties according to the test methods previously described in this disclosure. The rheological properties of the four resins were measured for each resin individually without addition of the curing agent, weighting material, or other additives. The rheological properties measured for Resins 1 through 4 are shown in Table 2, which is subsequently provided in this disclosure.

TABLE 2

Rheological Properties of Resins 1 Through 4

| Rheological Property | Resin 1 | Resin 2 | Resin 3 | Resin 4 |
| --- | --- | --- | --- | --- |
| Shear Stress at 600 rpm (lbf/100 ft$^2$) | 385 | 19 | 19.9 | 46 |
| Shear Stress at 300 rpm (lbf/100 ft$^2$) | 384.6 | 10 | 10.3 | 23.5 |
| Shear Stress at 200 rpm (lbf/100 ft$^2$) | 384.4 | 6.5 | 6.6 | 15.4 |
| Shear Stress at 100 rpm (lbf/100 ft$^2$) | 311.5 | 3.3 | 3.5 | 7.7 |
| Shear Stress at 6 rpm (lbf/100 ft$^2$) | 19.1 | 0.2 | 0.2 | 0.3 |
| Shear Stress at 3 rpm (lbf/100 ft$^2$) | 9.6 | 0.2 | 0.2 | 0.2 |
| 10-second Gel Strength (lbf/100 ft$^2$) | 9.5 | 0.1 | 0.2 | 0.2 |
| 10-Minute Gel Strength (lbf/100 ft$^2$) | 9.4 | 0.1 | 0.1 | 0.1 |
| PV (cP) | 0.4 | 9 | 9.6 | 22.5 |
| YP (lbf ft$^2$) | 384.2 | 1 | 0.7 | 1 |

As shown in Table 2, Resin 2, Resin 3, and Resin 4 exhibited lesser rheology as shown by the shear stress values of less than 25 lbf/100 ft$^2$ over the range of 3 rpm to 600 rpm for Resins 2, 3, and 4. In contrast, Resin 1 exhibited greater rheology as shown by the increased shear stress values measured over the range of 3 rpm to 600 rpm. Resin 1 also exhibited 10-second and 10-minute gel strengths and yield point that were greater than the 10-second and 10-minute gel strengths and yield point for Resins 2, 3, and 4. As demonstrated by the results in Table 2, the properties of the sealing compositions may be adjusted by adding or substituting different epoxy resins into the sealing compositions.

Example 2: Resin 4 and TEPA Curing Agent

In Example 2, Resin 4 was mixed with different quantities of the curing agent TEPA (tetraethylenepentamine) to evaluate the curing time required for sealing compositions comprising Resin 4 and TEPA to change from a liquid phase to a solid or semi-solid phase. A quantity of 100 grams of Resin 4 at 200 degrees Fahrenheit (° F.) (93.3 degrees Celsius (° C.)) was added to each of three containers. Quantities of 3 grams, 5.5 grams, and 6 grams of TEPA curing agent were added to the 100 grams of Resin 4 in one of each of the three containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 3. The estimated cure times are provided in units of hours (hrs) and minutes (min) throughout these Examples.

TABLE 3

Observations During Cure Time for Resin 4 with TEPA Curing Agent

| Sample ID | Resin | Curing agent | Quantity of Resin (g) | Quantity of Curing Agent (g) | Observation |
| --- | --- | --- | --- | --- | --- |
| 2A | Resin 4 | TEPA | 100 | 3 | Liquid after 8 hrs, semi-solid after a week |
| 2B | Resin 4 | TEPA | 100 | 6 | Semi-solid after 4 hrs 38 min |
| 2C | Resin 4 | TEPA | 100 | 5.5 | Liquid after 8 hrs |

It was observed that each of the mixtures turned darker in color and became thicker in viscosity as time progressed. Each of Samples 2A-2C ultimately cured to a solid sealing composition. As indicated in Table 3, the cure time to cure the mixtures of Resin 4 and TEPA curing agent decreased with increasing quantities of the TEPA curing agent added to Resin 4. Sample 2A having 3 grams of TEPA was liquid after 8 hours and cured to a rubbery solid after a week. Sample 2B having 6 grams of TEPA cured to a semi-solid state in 4 hours and 38 minutes. For Sample 2C, the amount of TEPA was reduced slightly to 5.5 grams, which resulted in Sample 2C remaining a liquid after 8 hours. Sample 2C eventually cured into a solid sealing composition.

Example 3: Resin 4 and IPDA Curing Agent

In Example 3, Resin 4 was mixed with different quantities of IPDA (isophoronediamine) curing agent to evaluate the curing time required for sealing compositions comprising Resin 4 and IPDA to change from a liquid phase to a solid or semi-solid phase. A quantity of 100 grams of Resin 4 at 200° F. (93.3° C.) was added to each of six containers. Quantities of 5 grams, 10 grams, 11 grams, 12 grams, 13, grams, and 14 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 4.

TABLE 4

Observations During Cure Time for Resin 4 with IPDA Curing Agent

| Sample ID | Resin | Curing agent | Quantity of Resin (g) | Quantity of Curing Agent (g) | Observation |
|---|---|---|---|---|---|
| 3A | Resin 4 | IPDA | 100 | 10 | Liquid after 8 hrs, change in color |
| 3B | Resin 4 | IPDA | 100 | 5 | Liquid after 8 hrs, change in color |
| 3C | Resin 4 | IPDA | 100 | 11 | Liquid after 8 hrs, thickness increases |
| 3D | Resin 4 | IPDA | 100 | 12 | Liquid after 8 hrs, thickness increases |
| 3E | Resin 4 | IPDA | 100 | 13 | Liquid after 8 hrs, thickness increases |
| 3F | Resin 4 | IPDA | 100 | 14 | Liquid after 8 hrs, thickness increases |

For Samples 3A and 3B, the quantities of IPDA curing agent of 10 grams and 5 grams, respectively, were observed to produce a color change in the sealing compositions of Samples 3A and 3B after 8 hours. However, the amounts of the IPDA curing agent in Samples 3A and 3B did not produce an observable difference in viscosity of the sealing composition after 8 hours. While the color changes of Samples 3A and 3B indicate the existence of some degree of curing, the amounts of IPDA curing agent in Samples 3A and 3B did not fully cure the sealing composition within a cure time of less than 8 hours. Samples 3A and 3B eventually cured to a rubbery solid within a cure time of 24 hours.

For Samples 3C through 3F, the amount of IPDA curing agent was progressively increased from 11 grams in Sample 3C to 14 grams in Sample 3F. Sample 3C having 11 grams of IPDA curing agent per 100 grams of resin exhibited an observable thickening of the sealing composition after 8 hours of cure time. Samples 3D, 3E, and 3F also exhibited thickening of the sealing composition after 8 hours. However, Samples 3C through 3F did not fully cure to a semi-solid or solid composition after 8 hours of cure time. Thus, for a sealing composition comprising Resin 4 with IPDA as the curing agent, more than 14 grams of the IPDA curing agent per 100 grams of Resin 4 may be required to cure the sealing composition to at least a semi-solid composition in less than 12 hours.

Example 4: Resin 4 and DETA Curing Agent

In Example 4, Resin 4 was mixed with different quantities of DETA (diethylenetriamine) curing agent to evaluate the curing time required for sealing compositions comprising Resin 4 and DETA to change from a liquid phase to a solid or semi-solid phase. A quantity of 100 grams of Resin 4 at 200° F. (93.3° C.) was added to each of six containers. Quantities of 3 grams, 5 grams, 7 grams, 7.5 grams, 8 grams, and 9 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 5.

TABLE 5

Observations During Cure Time for Resin 4 with DETA Curing Agent

| Sample ID | Resin | Curing agent | Quantity of Resin (g) | Quantity of Curing Agent (g) | Observation |
|---|---|---|---|---|---|
| 4A | Resin 4 | DETA | 100 | 3 | Liquid after 8 hrs |
| 4B | Resin 4 | DETA | 100 | 5 | Liquid after 8 hrs |
| 4C | Resin 4 | DETA | 100 | 7 | Semi-solid after 6 hrs and 10 min |
| 4D | Resin 4 | DETA | 100 | 7.5 | Semi-solid after 4 hrs and 50 min |
| 4E | Resin 4 | DETA | 100 | 8 | Semi-solid after 4 hrs |
| 4F | Resin 4 | DETA | 100 | 9 | Semi-solid after 3 hrs |

Samples 4A and 4B having 3 grams and 5 grams of DETA, respectively, were observed to be a liquid after a cure time of 8 hours. Therefore, the amounts of DETA in Samples 4A (3 grams) and 4B (5 grams) did not enable Resin 4 to cure to a semi-solid or solid in less than or equal to 8 hours. Samples 4A and 4B were observed to cure into a rubbery solid after a cure time of 24 hours. For Samples 4C-4F, the amounts of DETA added to Resin 4 were progressively increased from 7 grams to 9 grams. Sample 4C having 7 grams of DETA curing agent was observed to cure into a semi-solid composition after 6 hours and 10 minutes. Samples 4D-4F having 7.5 grams, 8 grams, and 9 grams of DETA, respectively, exhibited decreasing cure times to produce the semi-solid composition as the quantity of DETA was increased. Thus, it is observed that a sealing composition that includes Resin 4 and DETA as the curing agent may have an amount of DETA curing agent greater than 5 grams per 100 grams of Resin 4, without adding an accelerator. For example, the sealing composition may include Resin 4 and greater than or equal to 7 grams DETA curing agent per 100 grams of Resin 4. As the amount of DETA curing agent increases, the curing time decreases.

Example 5: Resin 4 and TETA

In Example 5, Resin 4 was mixed with different quantities of TETA (triethylenetetramine) curing agent to evaluate the curing time required for sealing compositions comprising Resin 4 and TETA to change from a liquid phase to a solid or semi-solid phase. A quantity of 100 grams of Resin 4 at 200° F. (93.3° C.) was added to each of five containers. Quantities of 2 grams, 3 grams, 4 grams, 5 grams, and 5.5 grams of TETA curing agent were added to the 100 grams of Resin 4 in one of each of the five containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 6.

TABLE 6

Observations During Cure Time for
Resin 4 with TETA Curing Agent

| Sample ID | Resin | Curing agent | Quantity of Resin (g) | Quantity of Curing Agent (g) | Observation |
|---|---|---|---|---|---|
| 5A | Resin 4 | TETA | 100 | 2 | Liquid after 8 hrs, thickness increases |
| 5B | Resin 4 | TETA | 100 | 3 | Liquid after 8 hrs, thickness increases |
| 5C | Resin 4 | TETA | 100 | 4 | Liquid after 8 hrs, thickness increases |
| 5D | Resin 4 | TETA | 100 | 5 | Liquid after 8 hrs, thickness increases |
| 5E | Resin 4 | TETA | 100 | 5.5 | Semi-solid after 5 hrs and 45 min |

For Samples 5A-5D, the amount of TETA curing agent per 100 grams of Resin 4 was increased from 2 grams to 5 grams. Samples 5A-5D were all liquids after a cure time of 8 hours, but each of Samples 5A-5D exhibited observable thickening of the sealing composition comprising Resin 4 and TETA. Samples 5A-5D were observed to cure to a rubbery solid after a cure time of more than 12 hours. Sample 5E included 5.5 grams of TETA per 100 grams of Resin 4 and cured to a semi-solid composition after a cure time of 5 hours and 45 minutes. Therefore, it is observed that a sealing composition comprising Resin 4 and TETA curing agent may have greater than 5 grams TETA per 100 grams of Resin 4, or greater than or equal to 5.5 grams TETA per 100 grams of Resin 4, for the sealing composition to cure to at least a semi-solid composition in less than 8 hours without adding an accelerator.

The combination of Resin 4 and the TETA curing agent of Example 5 resulted in a faster rate of cure of the epoxy resin and a lesser cure time compared to combinations of Resin 4 with TEPA, IPDA, or DETA in Examples 2, 3, and 4, respectively. As previously discussed, the combination of Resin 4 with only 5.5 grams of TETA in Example 5 cured the sealing composition to a semi-solid composition in less than 6 hours. In comparison, the sealing composition of Example 2, in particular Sample 2C that included Resin 4 and 5.5 grams of TEPA, was still a liquid after 8 hours of curing. For the combination of Resin 4 and TEPA curing agent of Example 2, 6 grams TEPA per 100 grams of Resin 4 resulted in curing Resin 4 to a semi-solid composition in less than 8 hours.

Example 6: Resin 1 and TEPA Curing Agent

In Example 6, Resin 1 was mixed with different quantities of TEPA (tetraethylenepentamine) curing agent to evaluate the curing time required for sealing compositions comprising Resin 1 and TEPA to change from a liquid phase to a solid or semi-solid phase. A quantity of 100 grams of Resin 1 at 200° F. (93.3° C.) was added to each of four containers. Quantities of 1 gram, 2 grams, 3 grams, and 3.5 grams of TEPA curing agent were added to the 100 grams of Resin 1 in one of each of the four containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 7.

TABLE 7

Observations During Cure Time for
Resin 1 with TEPA Curing Agent

| Sample ID | Resin | Curing agent | Quantity of Resin (g) | Quantity of Curing Agent (g) | Observation |
|---|---|---|---|---|---|
| 6A | Resin 1 | TEPA | 100 | 1 | Color changed, liquid after 6 hrs |
| 6B | Resin 1 | TEPA | 100 | 2 | Color changed, liquid after 8 hrs |
| 6C | Resin 1 | TEPA | 100 | 3 | Color changed, thickness increased after 8 hrs |
| 6D | Resin 1 | TEPA | 100 | 3.5 | Color changed, semi-solid after 4 hrs |

For Samples 6A and 6B, the quantities of TEPA curing agent of 1 gram and 2 grams, respectively, were observed to produce a color change in the sealing compositions of Samples 6A and 6B after 6 hours and 8 hours, respectively. While the color change of Samples 6A and 6B indicates the existence of some degree of curing of the Resin 1, the amounts of TEPA curing agent in Samples 6A and 6B did not produce an observable change in viscosity or cure Resin 1 into a semi-solid or solid composition in 8 hours or less. Samples 6A and 6B were observed to cure to a rubbery solid after a cure time of 12 hours.

For Sample 6C, the amount of TEPA was increased to 3 grams per 100 grams of Resin 1, which resulted in a change in color as well as an observable increase in the thickness (viscosity) of Resin 1 after a cure time of 8 hours. Increasing the amount of TEPA to 3.5 grams per 100 grams of Resin 1 in Sample 6D resulted in curing Resin 1 to a semi-solid composition after a cure time of 4 hours.

Examples 7-10: Resin 2 and Various Curing Agents

In Examples 7-10, Resin 2 was mixed with different quantities of DETA (diethylenetriamine), TETA (triethylenetetramine), TEPA (tetraethylenepentamine), IPDA (isophoronediamine) curing agents to evaluate the curing time required for the various sealing compositions to change from a liquid phase to a solid or semi-solid phase. For Example 7, a quantity of 100 grams of Resin 2 at 200° F. (93.3° C.) was added to each of two containers. Quantities of 7 grams and 9 grams of DETA curing agent were added to the 100 grams of Resin 2 to each of the two containers, respectively. For Example 8, a quantity of 100 grams of Resin 2 at 200° F. (93.3° C.) was added to each of three containers. Quantities of 5.5 grams, 6 grams, and 8 grams of TETA curing agent were added to the 100 grams of Resin 2 to each of the three containers, respectively. For Example 9, a quantity of 100 grams of Resin 2 at 200° F. (93.3° C.) was added to each of two containers. Quantities of 15 grams and 20 grams of IPDA curing agent were added to the 100 grams of Resin 2 to each of the two containers, respectively. For Example 10, a quantity of 100 grams of Resin 2 at 200° F. (93.3° C.) was added to each of two containers. Quantities of 7 grams and 10 grams of TEPA curing agent were added to the 100 grams of Resin 2 to each of the two containers, respectively.

The contents of each container of Examples 7-10 were thoroughly mixed. The mixtures of Examples 7-10 were heated using a hot roll to maintain the temperature of the mixtures at 200° F. (93.3° C.). Changes in the color, phase, and hardness of each of the mixtures of Examples 7-10 were observed over time. Observations of phase and hardness for Examples 7-10 are subsequently provided in Table 8.

TABLE 8

Observations During Cure Time for Resin 2 with DETA (Example 7), TETA (Example 8), IPDA (Example 9), and TEPA (Example 10)

| Sample ID | Resin | Curing agent | Quantity of Resin (g) | Quantity of Curing Agent (g) | Observation |
|---|---|---|---|---|---|
| 8A | Resin 2 | DETA | 100 | 7 | Liquid after 8 hrs |
| 8B | Resin 2 | DETA | 100 | 9 | Liquid after 8 hrs |
| 9A | Resin 2 | TETA | 100 | 6 | Liquid after 8 hrs |
| 9B | Resin 2 | TETA | 100 | 5.5 | Liquid after 8 hrs |
| 9C | Resin 2 | TETA | 100 | 8 | Liquid after 8 hrs |
| 10A | Resin 2 | IPDA | 100 | 20 | Liquid after 8 hrs |
| 10B | Resin 2 | IPDA | 100 | 15 | Liquid after 8 hrs |
| 11A | Resin 2 | TEPA | 100 | 10 | Liquid after 8 hrs |
| 11B | Resin 2 | TEPA | 100 | 7 | Liquid after 8 hrs |

The compositions of Examples 7-10 cured to solid sealing compositions following additional cure time beyond eight hours. However, the compositions of Examples 7-10 that included Resin 2 included greater quantities of the curing agent to cure to a semi-solid state compared to the sealing compositions of Examples 1-6 that included Resin 1 or Resin 4.

Example 11: Thickening Time of Samples A-E at a Test Temperature of 96° F.

For Example 11, Resin 1, Resin 2, and a curing agent were mixed in varying amounts under constant testing conditions to observe the effect on thickening time. For the tests run in Example 11, the bottom hole static temperature (BHST) was 124° F., the bottom hole circulating temperature was 96° F., the ramp time was 30 minutes, the pressure was 1500 psi, the density was 80 pcf, and the test temperature was 96° F.

In Example 11, five samples were prepared, designated Samples A-E. The materials used in Samples A-E were Resin 1, Resin 2, Micromax Weight Additive (manufactured by Halliburton), Curing Agent 931 ("CA 1," Razeencure 931 manufactured by Jubail Chemical Industries Co.), HR-5 Retarder ("Retarder 1," manufactured by Halliburton). Table 9 provides the compositions of Samples A-E and the resulting cure times of each sample under the testing conditions.

TABLE 9

Composition of Samples A-E.

|  | Sample A | | Sample B | | Sample C | | Sample D | | Sample E | |
|---|---|---|---|---|---|---|---|---|---|---|
| Cure Time | 2:46 | | 4:04 | | 6:53 | | 8:08 | | 5:16 | |
| BHST | 124° F. | | 124° F. | | 124° F. | | 124° F. | | 124° F. | |
| BHCT | 96° F. | | 96° F. | | 96° F. | | 96° F. | | 96° F. | |
| Ramp Time | 30 min | | 30 min | | 30 min | | 30 min | | 30 min | |
| BC Final | 100 BC | | 100 BC | | 100 BC | | 40 BC | | 100 BC | |
| Pressure | 1500 psi | | 1500 psi | | 1500 psi | | 1500 psi | | 1500 psi | |
| Density | 80 pcf | | 80 pcf | | 80 pcf | | 80 pcf | | 80 pcf | |
| Test Temp. | 96° F. | | 96° F. | | 96° F. | | 96° F. | | 96° F. | |
|  | grams | wt. % | grams | wt. % | grams | wt. % | grams | wt. % | grams | wt. % |
| Resin 1 | 480 | 59.61 | 480 | 60.26 | 480 | 60.60 | 480 | 60.93 | 450 | 55.69 |
| Resin 2 | 120 | 14.90 | 120 | 15.07 | 120 | 15.15 | 120 | 15.23 | 150 | 18.56 |
| Micromax | 181.2 | 22.50 | 178.5 | 22.41 | 177.1 | 22.36 | 175.8 | 22.32 | 190 | 23.52 |
| CA 1 | 24 | 2.98 | 18 | 2.26 | 15 | 1.89 | 12 | 1.52 | 18 | 2.23 |
| Retarder 1 | 0 | 0.00 | 0 | 0.00 | 0 | 0.00 | 0 | 0.00 | 0 | 0.00 |
| Total | 805.2 | 100 | 796.5 | 100 | 792.1 | 100 | 787.8 | 100 | 808 | 100 |

Based on the results of Table 9, the cure time of Samples A-C increased as the amount curing agent decreased. Additionally, for Samples B and E both having 24 grams of curing agent, Sample E with approximately 56 wt. % Resin 1 and 19 wt. % Resin 2 had a greater cure time than Sample B with approximately 60 wt. % Resin 1 and 15 wt. % Resin 2.

Example 12: Thickening Time of Samples F-J at a Test Temperature of 86° F.

For Example 12, Resins 1 and 2 were mixed in varying amounts under constant testing conditions to observe the effect on thickening time. For the tests run in Example 12, the bottom hole static temperature (BHST) was 135° F., the bottom hole circulating temperature was 86° F., the ramp time was 30 minutes, the pressure was 1500 psi, the density was 80 pcf, and the test temperature was 96° F.

In Example 12, five samples were prepared, designated Samples F-J. The materials used in Samples F-J were Resin 1, Resin 2, Micromax Weight Additive (manufactured by Halliburton), Curing Agent 931 ("CA 1," Razeencure 931 manufactured by Jubail Chemical Industries Co.), HR-5 Retarder ("Retarder 1," manufactured by Halliburton). Table 10 provides the compositions of Samples F-J and the resulting cure times of each sample under the testing conditions.

epoxy resin portion of the epoxy resin system. Then, Sample K and Comparative Sample A were tested for their rheological properties at 75° F., according to the test method previously described. The results of the rheological testing of Sample K and Comparative Sample A are provided in Table 11.

TABLE 11

Rheology of Sample K and Comparative Sample A at 75° F.

| Comparative Sample A Resin 1 only | | Sample K Resin 1 (80 wt. %) and Resin 2 (20 wt. %) | |
| --- | --- | --- | --- |
| 300 rpm | Over range | 300 rpm | 265 |
| 200 rpm | Over range | 200 rpm | 175 |
| 1100 rpm | Over range | 100 rpm | 90 |
| 6 rpm | 21 | 6 rpm | 6 |
| 3 rpm | 10 | 3 rpm | 3 |

Based on the results provided in Table 11, it was observed that Sample K had a lesser viscosity than Comparative Sample A. The lesser viscosity of Sample K allows the sealing composition of the dual resin system to have improved injectivity over the single resin system of Comparative Sample A. Therefore, it is believed that Sample K

TABLE 10

Observations for Cure Time for Resins 1 and 2 in Varying Amounts under 86° F. Testing Conditions.

|  | Sample F | Sample G | Sample H | Sample I | Sample J |
| --- | --- | --- | --- | --- | --- |
| Cure Time | 1:29 | 2:06 | 3:51 | 1:58 | 3:12 |
| BHST | 135° F. | 135° F. | 135° F. | 135° F. | 135° F. |
| BHCT | 86° F. | 86° F. | 86° F. | 86° F. | 86° F. |
| Ramp Time | 30 min | 30 min | 30 min | 30 min | 30 min |
| BC Final | 100 BC | 100 BC | 100 BC | 40 BC | 100 BC |
| Pressure | 1500 psi | 1500 psi | 1500 psi | 1500 psi | 1500 psi |
| Density | 80 pcf | 80 pcf | 80 pcf | 80 pcf | 80 pcf |
| Test Temp. | 86° F. | 86° | 86° F. | 86° F. | 86° F. |

|  | grams | wt. % | grams | wt. % | grams | wt. % | grams | wt. % | grams | wt. % |
| --- | --- | --- | --- | --- | --- | --- | --- | --- | --- | --- |
| Resin 1 | 540 | 69.03 | 540 | 69.49 | 480 | 76.92 | 540 |  | 480 | 59.61 |
| Resin 2 | 60 | 7.67 | 60 | 7.72 | 120 | 19.23 | 60 |  | 120 | 14.90 |
| Micromax | 158.22 | 20.23 | 156.09 | 20.09 | 0 | 0.00 | 158.22 |  | 181.2 | 22.50 |
| CA 1 | 24 | 3.07 | 21 | 2.70 | 24 | 3.85 | 24 |  | 24 | 2.98 |
| Retarder 1 | 0 | 0.00 | 0 | 0.00 | 0 | 0.00 | 0.8 |  | 0 | 0.00 |
| Total | 782.22 | 100 | 777.09 | 100 | 624 | 100 |  |  | 805.2 | 100 |

Based on the results of Table 10, the cure time of Samples F and G increased as the amount curing agent decreased. Additionally, for Samples F, H, and J each having 24 grams of curing agent, Samples H and J with approximately 480 grams of Resin 1 and 120 grams Resin 2 had a greater cure time than Sample B with approximately 540 grams of Resin 1 and 60 grams of Resin 2. Additionally, when comparing Samples F and I's cure times, adding Retarder 1 was found to increase the cure time.

Example 13: Rheology of Sample K and Comparative Sample a at 75° F.

For Example 13, a Sample K sealing composition was prepared by combining 80 wt. % of Resins 1 with 20 wt. % Resin 2, based on the total weight of the epoxy resin portion of the composition. No curing agent was used in Sample K. Additionally, a Comparative Sample A sealing composition was prepared with only 100 wt. % of Resins 1, based on the would have provided effective zonal isolation and may reliably plug a wellbore during plugging and abandonment operations.

Example 14: Rheology of Sample L and Comparative Sample B at 75° F.

For Example 11, Resin 1, Resin 2, and a curing agent were mixed in varying amounts under constant testing conditions to observe the effect on rheology. In Example 14, two samples were prepared, designated Sample L and Comparative Sample B. The materials used in Sample L and Comparative Sample B were Resin 1, Resin 2, Curing Agent 931 ("CA 1," Razeencure 931 manufactured by Jubail Chemical Industries Co.), WellLock R1 ("Comparative Resin A," manufactured by Halliburton), WellLock R2 ("Comparative Resin B," manufactured by Halliburton), and WellLock H1 ("CA 2," manufactured by Halliburton). Table 12 provides the compositions of Sample L and Comparative Sample B.

TABLE 12

Composition of Sample L and Comparative Sample B.

| Sample L | | | Comparative Sample B | | |
|---|---|---|---|---|---|
| Component | grams | lb/bbl | Component | grams | lb/bbl |
| Resin 1 | 80 | 281.9 | Comp. Resin A | 160.43 | 224.6 |
| Resin 2 | 20 | 70.5 | Comp. Resin B | 53.10 | 74.3 |
| CA 1 | 4.6 | 16.2 | CA 2 | 61.77 | 86.5 |

Then, Sample L and Comparative Sample B were tested for their rheological properties at 75° F., according to the test method previously described. The results of the rheological testing of Sample K and Comparative Sample A are provided in Table 13.

TABLE 13

Rheology of Sample L and Comparative Sample B at 75° F.

| Sample L | | Comparative Sample B | |
|---|---|---|---|
| 300 rpm | 164 | 300 rpm | Over range |
| 200 rpm | 111 | 200 rpm | 221 |
| 100 rpm | 56 | 100 rpm | 124 |
| 6 rpm | 3 | 6 rpm | 7 |
| 3 rpm | 1 | 3 rpm | 4 |

Based on the results provided in Table 13, it was observed that Sample L had a lesser viscosity than Comparative Sample B. The lesser viscosity of Sample L allows the sealing composition of the dual resin system to have improved injectivity over the single resin system of Comparative Sample B. Therefore, it is believed that Sample L would have provided effective zonal isolation and may reliably plug a wellbore during plugging and abandonment operations.

The present disclosure includes one or more non-limiting aspects. A first aspect may include a method for plugging and abandoning a wellbore comprising: introducing a sealing composition into the plugging zone of a wellbore, the sealing composition comprising: from 0.1 weight percent to 30 weight percent of a curing agent, based on the total weight of the sealing composition, and from 70 weight percent to 99.9 weight percent of an epoxy resin system, based on the total weight of the sealing composition, the epoxy resin system comprising an epoxy resin having the formula $(OC_2H_3)—CH_2—O—R^1—O—CH_2—(C_2H_3O)$, where $R^1$ is a linear or branched hydrocarbyl having from 4 to 24 carbon atoms; and a reactive diluent having the formula $R—O—CH_2—(C_2H_3O)$, where R is a hydrocarbyl having from 12 to 14 carbon atoms; and allowing the sealing composition to cure by a reaction of the epoxy resin system and the curing agent, where the cured sealing composition forms a plug.

A second aspect may include the first aspect, further comprising allowing the sealing composition to cure for a time from 4 hours to 12 hours.

A third aspect may include any of the preceding aspects, further comprising identifying the plugging zone of the wellbore.

A fourth aspect may include any of the preceding aspects, further comprising introducing a spacer fluid into the wellbore.

A fifth aspect may include any of the preceding aspects, further comprising isolating the plugging zone.

A sixth aspect may include any of the preceding aspects, further comprising running tubing through the wellbore to a plugged-back total depth (PBTD) below the plugging zone.

A seventh aspect may include any of the preceding aspects, further comprising cleaning the wellbore with a cleaning fluid prior to introducing the sealing composition.

An eighth aspect may include any of the preceding aspects, further comprising mixing the sealing composition with a weighting material prior to introducing the sealing composition into the wellbore.

A ninth aspect may include any of the preceding aspects, where the weight ratio of the epoxy resin to the reactive diluent is from 1:99 to 99:1.

A tenth aspect may include any of the preceding aspects, where the curing agent comprises at least one of tetraethylenepentamine (TEPA), diethylenetriamine (DETA), triethylenetetramine (TETA), or isophoronediamine (IPDA).

An eleventh aspect may include any of the preceding aspects, where the epoxy resin has an epoxy value of from 4.5 epoxy equivalents per kilogram to 5.5 epoxy equivalents per kilogram.

A twelfth aspect may include any of the preceding aspects, where the epoxy resin has an epoxy equivalent weight of from 170 to 350 grams per epoxy equivalent.

A thirteenth aspect may include any of the preceding aspects, where the sealing composition further comprises an accelerator.

A fourteenth aspect may include any of the preceding aspects, where the sealing composition has a density of from 65 pounds per cubic foot to 150 pounds per cubic foot.

A fifteenth aspect may include any of the preceding aspects, where the viscosity of the sealing composition is from 60 millipascal seconds (mPa·s) to 1,000 mPa·s.

A sixteenth aspect may include any of the preceding aspects, where the epoxy resin comprises bisphenol-A-diglycidyl ether resin.

A seventeenth aspect may include any of the preceding aspects, where the epoxy resin comprises 1,6-hexanediol diclycidyl ether.

An eighteenth aspect may include any of the preceding aspects, where the sealing composition comprises from 2 weight percent to 10 weight percent curing agent, based on the total weight of the sealing composition.

A nineteenth aspect may include any of the preceding aspects, where the sealing composition further comprises a weighting material.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for plugging and abandoning a wellbore, the method comprising:
    running tubing through a wellbore to a plugged-back total depth (PBTD) below a plugging zone of a wellbore;
    introducing a sealing composition into the plugging zone of the wellbore, the sealing composition comprising:
        from 0.1 weight percent to 30 weight percent of a curing agent, based on the total weight of the sealing composition, and
        from 70 weight percent to 99.9 weight percent of an epoxy resin system, based on the total weight of the sealing composition, the epoxy resin system comprising
            i) bisphenol-A-(epichlorohydrin) epoxy resin,
            ii) an oxirane mono [(C12-C14)-alkyloxy)methyl] derivative, and
            iii) 2,3-epoxypropyl-o-tolyl ether;
    withdrawing the tubing to a position above a top of the sealing composition; and
    allowing the sealing composition to cure by a reaction of the epoxy resin system and the curing agent, where the cured sealing composition forms a plug.

2. The method of claim 1, further comprising allowing the sealing composition to cure for a time from 4 hours to 12 hours.

3. The method of claim 1, further comprising identifying the plugging zone of the wellbore.

4. The method of claim 1, further comprising introducing a spacer fluid into the wellbore.

5. The method of claim 1, further comprising isolating the plugging zone.

6. The method of claim 1, further comprising cleaning the wellbore with a cleaning fluid prior to introducing the sealing composition.

7. The method of claim 1, further comprising mixing the sealing composition with a weighting material prior to introducing the sealing composition into the wellbore.

8. The sealing composition of claim 1, where the curing agent comprises at least one of tetraethylenepentamine (TEPA), diethylenetriamine (DETA), triethylenetetramine (TETA), or isophoronediamine (IPDA).

9. The method of claim 1, where the sealing composition further comprises an accelerator.

10. The method of claim 1, where the sealing composition has a density of from 65 pounds per cubic foot to 150 pounds per cubic foot.

11. The method of claim 1, where the viscosity of the sealing composition is from 60 millipascal seconds (mPa·s) to 1,000 mPa·s.

12. The method of claim 1, where the sealing composition comprises from 2 weight percent to 10 weight percent curing agent, based on the total weight of the sealing composition.

13. The method of claim 1, where the sealing composition further comprises a weighting material.

14. The method of claim 1, where the weight ratio of the bisphenol-A-(epichlorohydrin) epoxy resin and the oxirane mono [(C12-C14)-alkyloxy)methyl] derivative combined to the 2,3-epoxypropyl-o-tolyl ether is in the range of 3:1 to 8:1.

15. The method of claim 14, where the weight ratio of the bisphenol-A-(epichlorohydrin) epoxy resin and the oxirane mono [(C12-C14)-alkyloxy)methyl] derivative combined to the 2,3-epoxypropyl-o-tolyl ether is about 4:1.

* * * * *

UNITED STATES PATENT AND TRADEMARK OFFICE
CERTIFICATE OF CORRECTION

| | |
|---|---|
| PATENT NO. | : 11,193,052 B2 |
| APPLICATION NO. | : 16/829470 |
| DATED | : December 7, 2021 |
| INVENTOR(S) | : Alshaikh et al. |

It is certified that error appears in the above-identified patent and that said Letters Patent is hereby corrected as shown below:

In the Specification

In Column 3, Line(s) 64, before "other material", delete "material".

In Column 7, Line(s) 25, delete "diclycidyl" and insert --diglycidyl--, therefor.

In Column 28, Line(s) 39, delete "diclycidyl" and insert --diglycidyl--, therefor.

Signed and Sealed this
First Day of November, 2022

Katherine Kelly Vidal
*Director of the United States Patent and Trademark Office*